United States Patent
Chung et al.

(10) Patent No.: US 9,860,485 B2
(45) Date of Patent: *Jan. 2, 2018

(54) RADIO POWER SAVING TECHNIQUES FOR VIDEO CONFERENCE APPLICATIONS

(71) Applicant: Apple Inc., Cupertino, CA (US)

(72) Inventors: Chris Y. Chung, Sunnyvale, CA (US); Wen Zhao, San Jose, CA (US); Luciano M. Verger, Santa Clara, CA (US); Hyeonkuk Jeong, Saratoga, CA (US); Gang Lu, Santa Clara, CA (US); Srinivasan Vasudevan, Sunnyvale, CA (US); Xiaosong Zhou, Campbell, CA (US); Hsi-Jung Wu, San Jose, CA (US); James O. Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/968,025

(22) Filed: Dec. 14, 2015

(65) Prior Publication Data

US 2016/0100131 A1      Apr. 7, 2016

Related U.S. Application Data

(63) Continuation of application No. 14/465,584, filed on Aug. 21, 2014, now Pat. No. 9,215,655, which is a
(Continued)

(51) Int. Cl.
*H04N 7/15* (2006.01)
*H04W 52/02* (2009.01)
(Continued)

(52) U.S. Cl.
CPC ............ *H04N 7/15* (2013.01); *H04L 12/1827* (2013.01); *H04L 65/1069* (2013.01); *H04N 5/23241* (2013.01); *H04N 5/372* (2013.01); *H04W 52/02* (2013.01); *H04W 52/0209* (2013.01); *H04W 52/0216* (2013.01); *Y02B 60/50* (2013.01)

(58) Field of Classification Search
CPC ............................. H04N 7/15; H04L 12/1827
See application file for complete search history.

(56) References Cited

U.S. PATENT DOCUMENTS

7,801,168 B2   9/2010  Trainin
7,920,485 B2   4/2011  Tung
(Continued)

*Primary Examiner* — Albert T Chou
(74) *Attorney, Agent, or Firm* — Meyertons, Hood, Kivlin, Kowert & Goetzel, P.C.

(57) ABSTRACT

In video conferencing over a radio network, the radio equipment is a major power consumer especially in cellular networks such as LTE. In order to reduce the radio power consumption in video conferencing, it is important to introduce an enough radio inactive time. Several types of data buffering and bundling can be employed within a reasonable range of latency that doesn't significantly disrupt the real-time nature of video conferencing. In addition, the data transmission can be synchronized to the data reception in a controlled manner, which can result in an even longer radio inactive time and thus take advantage of radio power saving modes such as LTE C-DRX.

20 Claims, 7 Drawing Sheets

Related U.S. Application Data continuation of application No. 13/667,814, filed on Nov. 2, 2012, now Pat. No. 8,830,892.

(60) Provisional application No. 61/695,256, filed on Aug. 30, 2012.

(51) Int. Cl.
*H04L 29/06* (2006.01)
*H04N 5/232* (2006.01)
*H04N 5/372* (2011.01)
*H04L 12/18* (2006.01)

(56) References Cited

U.S. PATENT DOCUMENTS

| | | |
|---|---|---|
| 7,962,182 B2 | 6/2011 | Kwan et al. |
| 8,830,892 B2 * | 9/2014 | Chung .................. H04W 52/02 370/311 |
| 9,215,655 B2 * | 12/2015 | Chung .................. H04W 52/02 |
| 2008/0261663 A1 | 10/2008 | Park et al. |
| 2010/0246591 A1 | 9/2010 | Gobriel et al. |
| 2011/0069649 A1 | 3/2011 | Gobriel et al. |
| 2012/0188925 A1 | 7/2012 | Lee et al. |
| 2013/0035082 A1 | 2/2013 | Sen et al. |

* cited by examiner

RADIO POWER SAVING TECHNIQUES FOR VIDEO CONFERENCE APPLICATIONS

RELATED APPLICATIONS

This application is a continuation of pending U.S. patent application Ser. No. 14/465,584, by the same inventors, entitled "Radio Power Saving Techniques for Video Conference Applications", filed Aug. 21, 2014, which is a continuation of U.S. patent application Ser. No. 13/667,814, by the same inventors, of the same title, filed Nov. 2, 2012, now U.S. Pat. No. 8,830,892, which claims the benefit of U.S. Provisional Patent Application No. 61/695,256, filed Aug. 30, 2012. All of these applications are incorporated herein by reference.

FIELD OF THE INVENTION

Embodiments of the present invention relate generally to power management of mobile devices. More particularly, embodiments of the invention relate to radio power saving techniques of video conference applications running in a mobile device.

BACKGROUND

Wireless communication systems are rapidly growing in usage. Further, wireless communication technology has evolved from voice-only communications to also include the transmission of video and data, such as Internet and multimedia content. Many wireless communication technologies, such as cellular communication technologies, are substantially designed to provide mobile communication capabilities to wireless devices, such as cellular phones. Accordingly, wireless devices are generally powered by a portable power supply, e.g., a battery.

Batteries hold a finite charge, and so in order to improve battery life of wireless devices, one approach is to reduce power consumption required to perform wireless communications. Accordingly, some wireless communication technologies implement features designed to conserve power while still providing a high-quality user experience. One example of such a feature is the capability to operate in a connected-mode with discontinuous reception (C-DRX) in long term evolution (LTE).

In C-DRX according to LTE, a wireless device may monitor the physical downlink control channel (PDCCH) at specific intervals, and enter a reduced-power state between those intervals if a sufficient period of inactivity is observed. While this may conserve power under some circumstances, the amount of power savings is highly dependent on traffic patterns, and it is possible that no savings will be realized at all if not enough continuous inactivity is observed. In particular, certain types of traffic patterns, such as bi-directional interactive and multimedia traffic, can negatively impact the length of periods of inactivity between traffic bursts, particularly if uplink and downlink bursts are offset from each other, which may reduce power savings or prevent a wireless device from entering a reduced-power state between bursts at all.

Furthermore, if a wireless device is forced, due to non-synchronous traffic patterns, into operating in a continuous active state, this may not only impact the battery life of the wireless device, but may also cause device temperature to escalate quickly. These problems are further aggravated in areas with low signal strength, such as cell edges, where high transmission power may be required. Accordingly, improvements in wireless communications would be desirable.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, during a two-way real-time conference, such as an audio or video conference, conference data to be transmitted to a remote device is buffered for a predetermined period of time as a delay time period. During the predetermined period of time, the transmission path of the local device is inactive. After the predetermined period of time lapses, the transmission path of the local device is then turned active and the buffered conference data is then transmitted to the remote device. Thus, a longer inactive time period for the transmission path can be maintained with a longer delay of the real-time conference data transmission. As a result, radio power in the local device may be saved. According to one embodiment, the data transmitted is bundled into a data bundle that contains the audio data and the video data that are synchronized with each other to increase the inactive time period. As a result, radio power in the local device may be saved.

According to one embodiment, when the real-time conference data is received, audio portion of the data is examined to determine an audio energy level. If the audio energy level is below a predetermined threshold (e.g., no conversation occurs during the conference), the delay time period can be dynamically extended, which in turn extends the inactive period of the transmission path of the device. Similarly, if the real-time conference is a video conference, the video frames are analyzed to determine the amount of motion. If the amount of detected motion is smaller than a predetermined threshold (e.g., not much movement between the video frames), the delay time period can also be extended. During the delay time period, at least the transmission path of the device is in an inactive state. As a result, radio power in the local device may be saved.

According to one embodiment, the transmission data is synchronized with receiving data from the remote device. Data of the local device would not be transmitted to the remote device until some data has been received from the remote device. If there is no data received from the remote device, after a period of time, the transmission data is then transmitted to the remote device, in order to avoid a deadlock situation in which both ends are waiting for data received from their counterpart. With this transmission/reception synchronization, the inactive time period could be increased or maximized and as a result, radio power in the device may be further saved by entering into a C-DRX mode for example.

Figure 1:
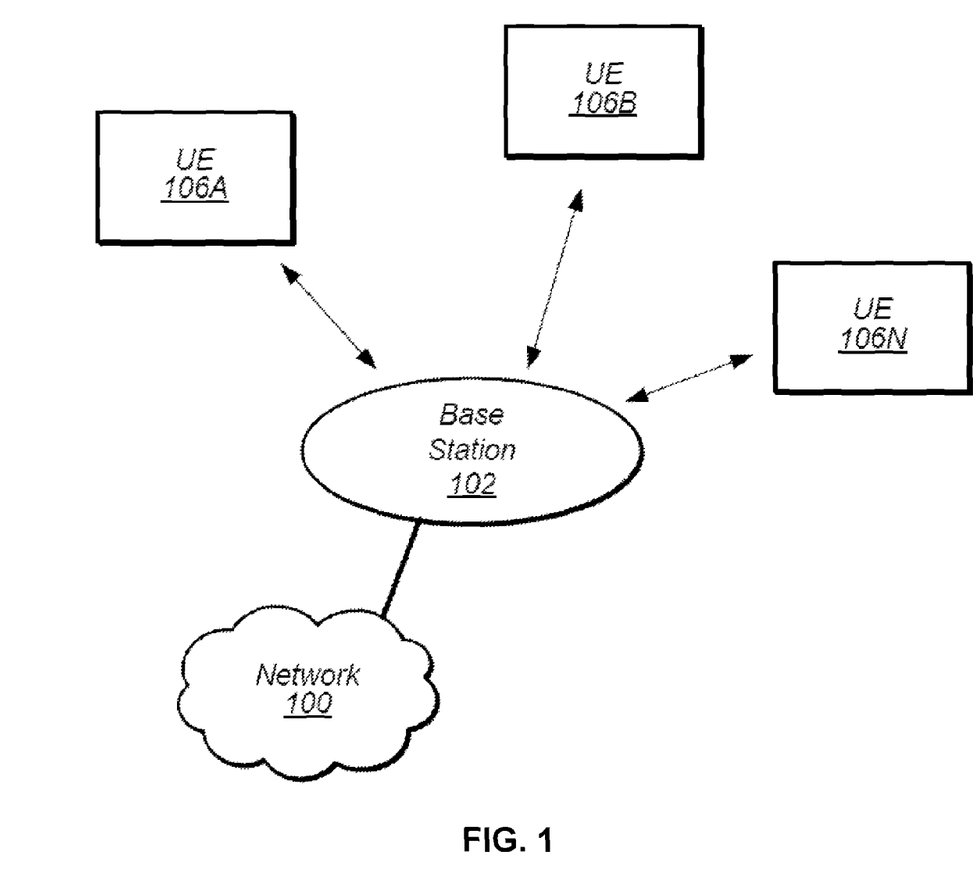
FIG. 1 is a block diagram illustrating a wireless communication system.

FIG. 1 is a block diagram illustrating a wireless communication system. It is noted that the system of FIG. 1 is merely one example of a possible system, and embodiments may be implemented in any of various systems, as desired. As shown, the wireless communication system includes a basestation 102 which communicates over a transmission medium with one or more user devices 106-1 through 106-N. Each of the user devices may be referred to herein as a "user equipment" (UE). Thus, the user devices 106 are referred to as UEs or UE devices.

The basestation 102 may be a base transceiver station (BTS) or cell site, and may include hardware that enables wireless communication with the UEs 106A through 106N. The basestation 102 may also be equipped to communicate with a network 100. Thus, the basestation 102 may facilitate communication between the UEs, between the UEs and the network 100 and/or between the UEs 106A through 106N and other UEs handled by another basestation connected to network 100. The communication area (or coverage area) of the basestation may be referred to as a "cell." The basestation 102 and the UEs may be configured to communicate over the transmission medium using any of various wireless communication technologies such as global system for mobile communications (GSM), code division multiple access (CDMA), wireless local loop (WLL), wide area network (WAN), WiFi, WiMAX, etc. The basestation 102 and other similar basestations operating according to the same or a different cellular communication standard may thus be provided as a network of cells, which may provide continuous or nearly continuous overlapping service to UE 106 and similar devices over a wide geographic area via one or more cellular communication standards.

UE 106 may be capable of communicating using multiple wireless communication standards. For example, the UE 106 might be configured to communicate using two or more of GSM, universal mobile telecommunications system (UMTS), CDMA200, WiMAX, LTE, wireless local area network (WLAN), Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the methods embodiments described herein by executing such stored instructions. In some embodiments, the UE 106 may include a programmable hardware element such as a field-programmable gate array (FPGA) that is configured to perform any of the method embodiments described herein, or any portion of any of the method embodiments described herein. The UE 106 may be configured to communicate using any of multiple wireless communication protocols. For example, the UE 106 may be configured to communicate using two or more of UMTS, CDMA 2000, LTE, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or 1×RTT, and separate radios for communicating using each of Wi-Fi and Bluetooth. Other configurations are also possible.

The UE 106 may also be configured to synchronize uplink transmissions with downlink transmissions. In particular, according to some embodiments the UE 106 may support connected mode discontinuous reception (C-DRX) for data communications between the UE 106 and the BS 102, and may be configured to synchronize uplink transmissions with downlink transmissions in a manner adapted to maximize the amount of time that the UE 106 spends in a reduced-power state as part of C-DRX.

Figure 2A:
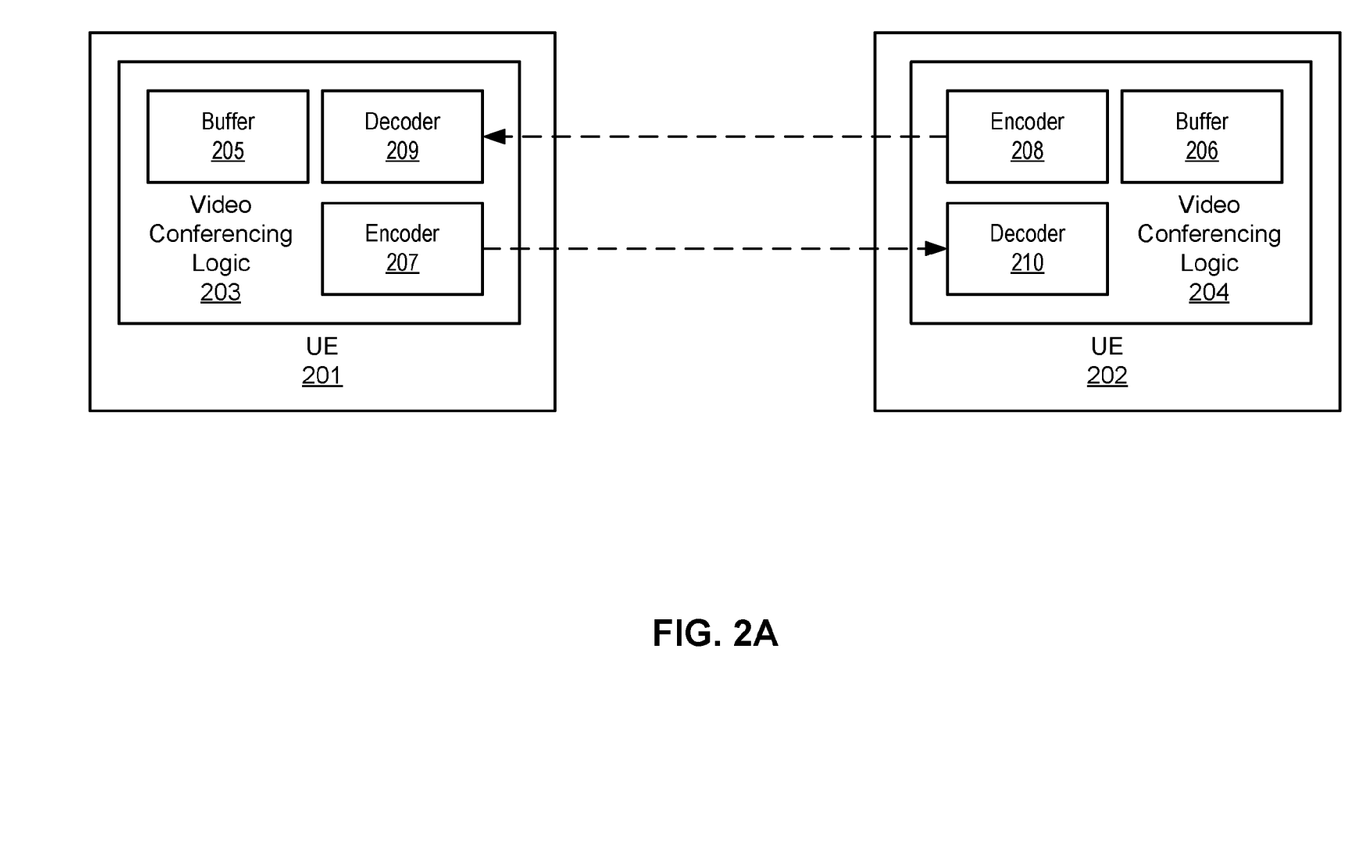
FIG. 2A is a block diagram illustrating an example of real-time communications between two user equipments according to one embodiment of the invention.

FIG. 2A is a block diagram illustrating an example of real-time communications between two user equipments according to one embodiment of the invention. Note that the communications between two UEs can be potentially done directly without a basestation or indirectly via at least one basestation. Referring to FIG. 2A, any of UEs 201-202 can represent any of UEs 106A-106N of FIG. 1. Each of the UEs 201-202 has the same or similar architecture. In this example, UE 201 includes video conferencing logic 203 having an encoder 207 and decoder 209, while UE 202 includes video conferencing logic 204 having encoder 208 and decoder 210. Note that throughout this application, video conferencing applications are utilized as an example of two-way real-time communications software. Video conferencing logic 203-204 can be implemented within a video conferencing application, a network stack of the corresponding UE, a baseband layer, and/or hardware. Video conferencing logic 203-204 can be implemented in software, hardware, or a combination thereof.

Referring to FIG. 2A, encoder 207 of UE 201 is to encode video conferencing data into a bundle and transmit the bundle in a delay fashion to UE 202 to be decoded by decoder 210, while encoder 208 of UE 202 is to encode video conferencing data into a bundle and transmit the bundle in a delay fashion to UE 201 to be decoded by decoder 209 during a video conferencing session between UEs 201-202. When encoder 207 receives video conferencing data from a video application, encoder 207 of UE 201 is to buffer the video conferencing data in buffer 205 without immediately transmitting the video conferencing data to UE 202. While the video conferencing data is being buffered in buffer 205, at least certain components of the transmission path of UE 201 (e.g., a radio frequency (RF) frontend such as transceiver, antenna, and/or amplifier) can be maintained in an inactive state, for example, to allow UE 201 to enter a C-DRX mode. As a result, the power consumption of UE 201 can be reduced. Similarly, encoder 208 of UE 202 is to perform in a similar manner as UE 201. For the purpose of illustration, the operations of UE 201 are described herein. The same or similar techniques can be equally applied to UE 202.

According to one embodiment, encoder 207 is to buffer the video conferencing data in buffer 205 for a predetermined delay time period, where the delay time period may be user configurable dependent upon the specific operating environment. During the predetermined period of time, at least certain components of the transmission path of UE 201 remain. After the predetermined period of time lapses, the transmission path of UE 201 is then turned active and the buffered conference data is then transmitted to UE 202. Thus, a longer inactive time period for the transmission path can be maintained with a longer delay of the real-time conference data transmission.

According to one embodiment, when the video conferencing data is received, encoder 207 examines audio portion of the video conferencing data to determine an audio energy level. If the audio energy level is below a predetermined threshold (e.g., no conversation occurs during the conference), encoder 207 is to dynamically extend or increase a duration of the delay time period, which in turn extends the inactive period of the transmission path of UE 201. Similarly, if the real-time conference is a video conference, the video frames are analyzed by encoder 207 to determine the amount of motion. If the amount of detected motion is smaller than a predetermined threshold (e.g., no significant motion in the video frames), the delay time period can also dynamically be extended. During the delay time period, at least the transmission path of the device is in an inactive state.

According to one embodiment, the transmission data is synchronized with receiving data from the remote device. Data of UE 201 would not be transmitted to UE 202 until some data has been received by decoder 209 from encoder 208 of UE 202. If there is no data received from UE 202, after a period of time, the buffered data is then transmitted to UE 202 anyway, in order to avoid a deadlock situation in which both UEs 201-202 are waiting for data received from their counterpart. In one embodiment, the data transmitted is bundled into a data bundle that contains the audio data and the video data that are synchronized with each other.

Figure 2B:
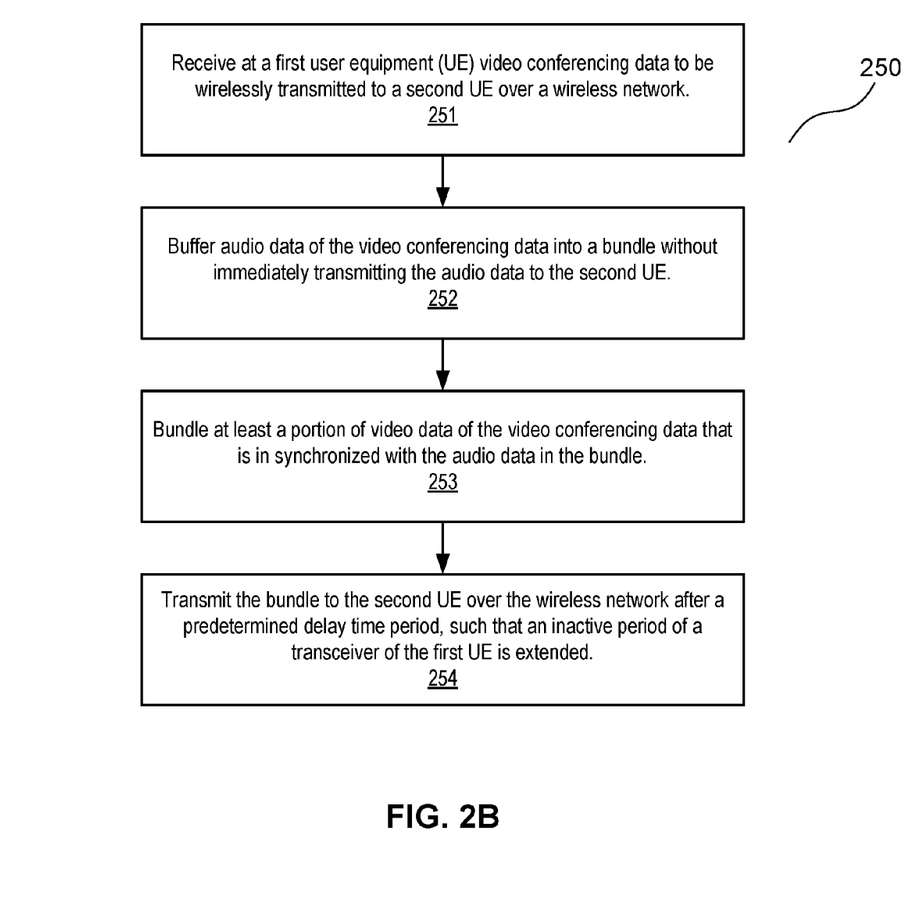
FIG. 2B is a flow diagram illustrating a method for processing real-time conferencing data according to one embodiment of the invention.

FIG. 2B is a flow diagram illustrating a method for processing real-time conferencing data according to one embodiment of the invention. Method 250 may be performed by any of UEs 201-202 of FIG. 2A. Referring to FIG. 2B, at block 251, video conferencing data is received at conferencing logic of a first UE, where the conferencing data is to be transmitted to a second UE over a wireless network. At block 252, at least the audio portion of the conferencing data is buffered in to a bundle in a buffer of the first UE without immediately transmitting to the second UE. At block 253, at least a portion of a video portion of the conferencing data is bundled that is synchronized with the audio portion of the bundle. At block 254, the bundle is transmitted to the second UE over the wireless network after a predetermined delay time period, during which at least a portion of a transmission path of the first UE remains inactive.

Figure 3:
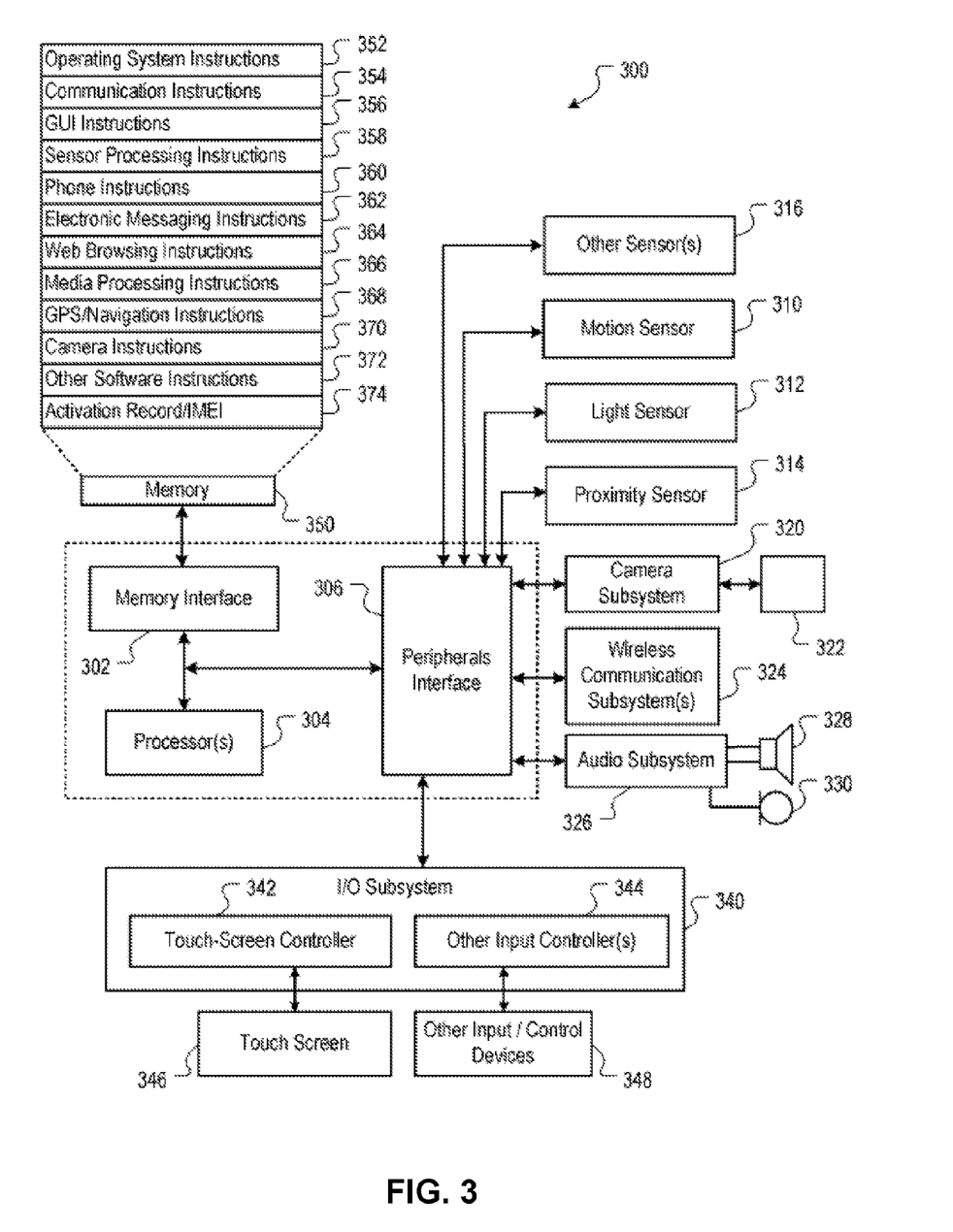
FIG. 3 is a block diagram of an example implementation of a mobile device which may be used with an embodiment of the invention.

FIG. 3 is a block diagram of an example implementation of a mobile device according to one embodiment of the invention. For example, mobile device 300 may represent any of UEs 201-202 of FIG. 1B. Referring to FIG. 3, the mobile device 300 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 311 can be coupled to the peripherals interface 306 to facilitate the orientation, lighting, and proximity functions described with respect to FIG. 2A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the mobile device may be configured as a basestation for other wireless devices. An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346. The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device on or off. The user may be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device may be implemented in hardware and/or in software, including in one or more signal processing and/or application specific integrated circuits.

Figure 4:
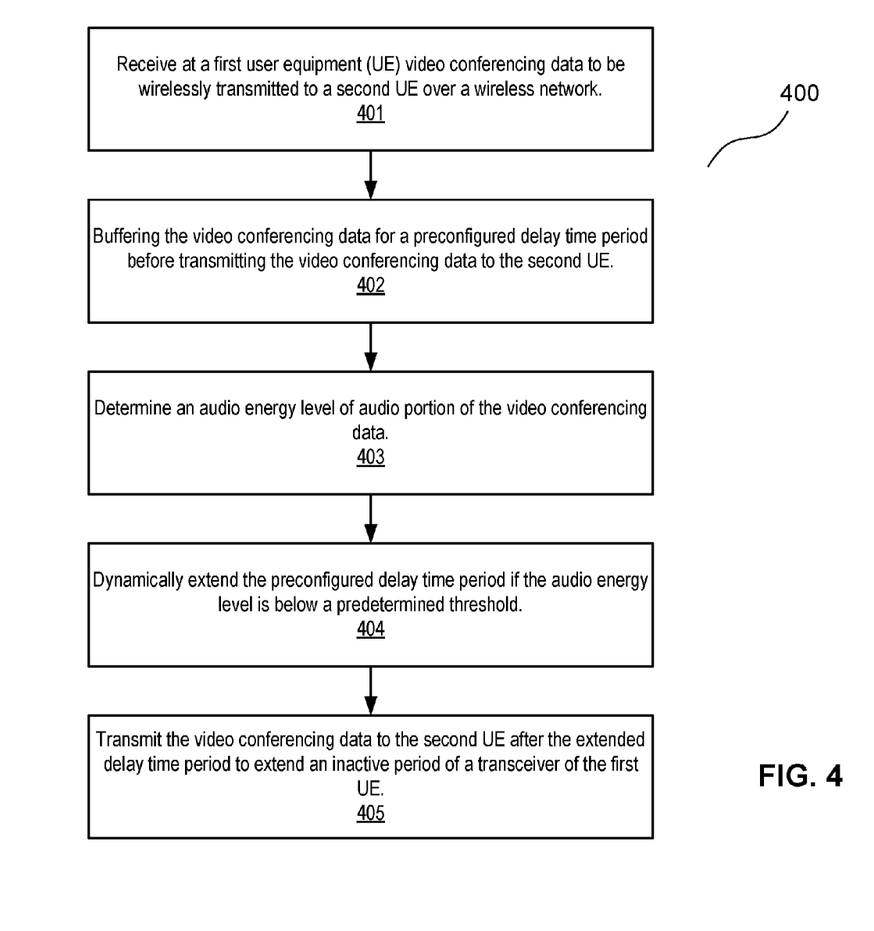
FIGS. 4-6 are flow diagrams illustrating a method for processing conferencing data according to certain embodiments of the invention.

FIG. 4 is a flow diagram illustrating a method for processing conferencing data according to another embodiment of the invention. Method 400 may be performed by any of UEs 201-202 of FIG. 2A. Referring to FIG. 4, at block 401, video conferencing data is received at a first UE, where the video conference data is part of a video conference to be transmitted to a second UE over a wireless network. At block 402, the video conferencing data is buffered within the first UE for a predetermined delay time period without immediately transmitting to the second UE. At block 403, processing logic determines an audio energy level of the audio portion of the video conferencing data. At block 404, the delay time period is dynamically extended or increased if the audio energy level is below a predetermined threshold. At block 405, the buffered video conferencing data is then transmitted to the second UE after the extended delay time period.

Figure 5:
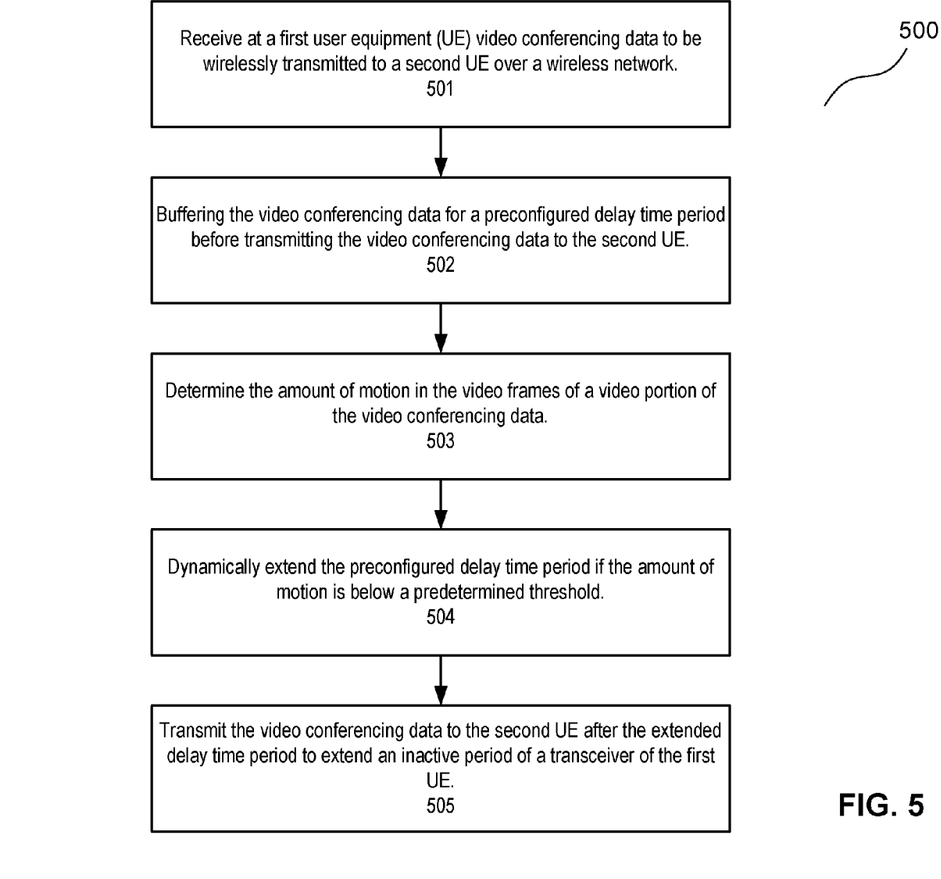

FIG. 5 is a flow diagram illustrating a method for processing conferencing data according to another embodiment of the invention. Method 500 may be performed by any of UEs 201-202 of FIG. 2A. Referring to FIG. 5, at block 501, video conferencing data is received at a first UE, where the video conference data is part of a video conference to be transmitted to a second UE over a wireless network. At block 502, the video conferencing data is buffered within the first UE for a predetermined delay time period without immediately transmitting to the second UE. At block 503, processing logic determines the amount of motion in the video frames of the video conferencing data. At block 504, the delay time period is dynamically extended or increased if the amount of detected motion is below a predetermined threshold. At block 505, the buffered video conferencing data is then transmitted to the second UE after the extended delay time period.

Figure 6:
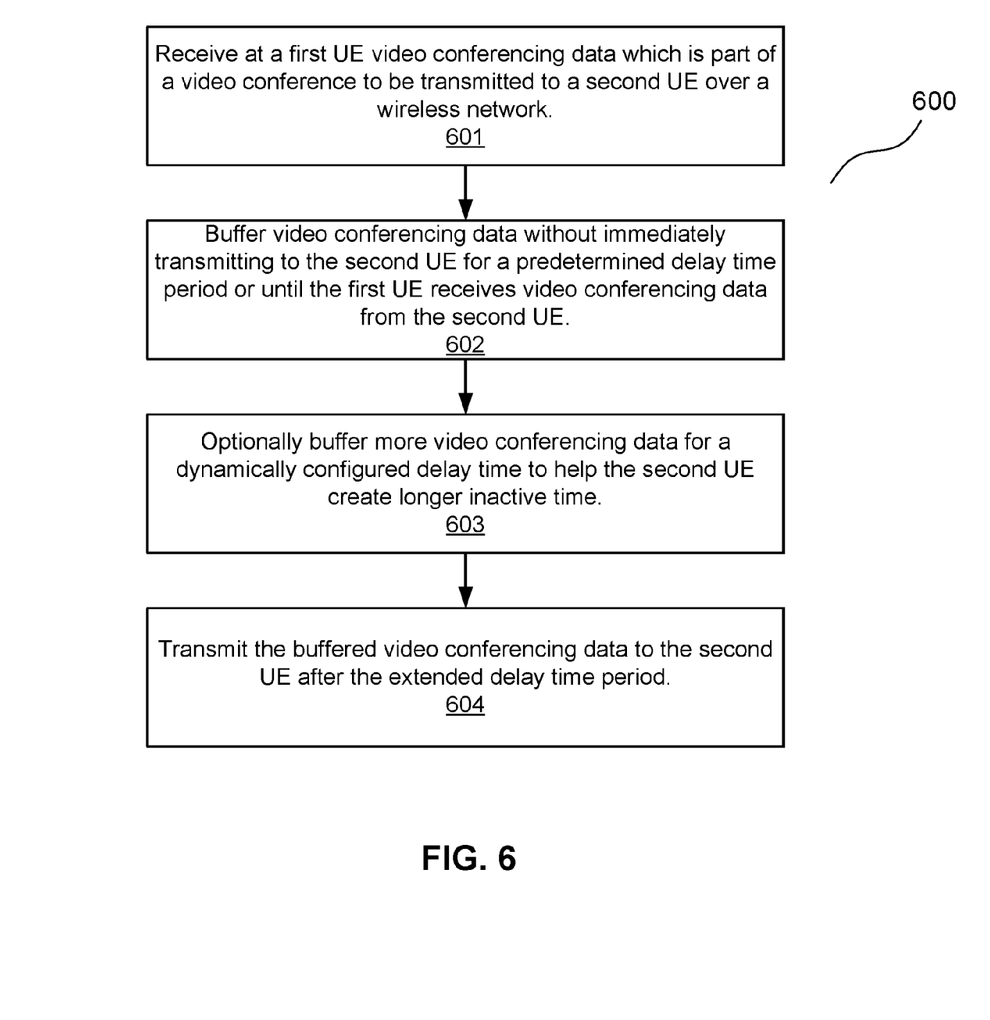

FIG. 6 is a flow diagram illustrating a method for processing conference data according to another embodiment of the invention. Method 600 may be performed by any of UEs 201-202 of FIG. 2A. Referring to FIG. 6, at block 601, video conferencing data is received at a first UE, where the video conference data is part of a video conference to be transmitted to a second UE over a wireless network. At block 602, the video conferencing data is buffered within the first UE without immediately transmitting to the second UE for a predetermined delay time period or until the first UE receives video conferencing data from the second UE. At block 603, the first UE can optionally buffer more video conferencing data for a dynamically configured delay time period to allow the second UE observe a longer inactive time. The dynamically configured delay time could be determined by network conditions such as communication speed and latency, and can potentially let the second UE enter into a C-DRX mode. At block 604, the buffered video conferencing data is then transmitted to the second UE after the extended delay time period. The optional additional data buffering can also be done in the basestation to allow both communicating UEs observe a longer inactive time.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. User equipment (UE) that handles conference data, comprising:
    an encoder; and
    a transceiver;
    wherein the encoder is configured to:
        buffer, for a delay time period, real-time conference data of a real-time conference session; and
        generate a conference data bundle that comprises synchronized audio and video data from the real-time conference data; and
    wherein the transceiver is configured to:
        transmit the conference data bundle to a remote device after the delay time period.

2. The user equipment of claim 1, wherein the encoder is configured to:
    determine an audio energy level of an audio portion of the real-time conference data; and
    extend the delay time period if the audio energy level is below a threshold.

3. The user equipment of claim 1, wherein the encoder is configured to:
    determine an amount of motion in video frames of the real-time conference data; and
    extend the delay time period if the amount of motion is below a threshold.

4. The user equipment of claim 1, further comprising:
    a decoder;
    wherein the encoder is configured to buffer the conference data bundle until second conference data is received by the decoder from the remote device; and
    wherein the transceiver is further configured to perform the transmit operation when the second conference data is received.

5. The user equipment of claim 1, wherein the encoder is configured to:
    set the delay time period based on an inactive time for the remote device.

6. The user equipment of claim 1, wherein the real-time-conference data is generated by a real-time video conference application.

7. The user equipment of claim 1, further comprising:
    a processor configured to execute a real-time video conference application; and
    a network stack;
    wherein the encoder is included in one of the real-time video conference application or the network stack.

8. The user equipment of claim 1, wherein the encoder is configured to:
    initiate a transmission/reception synchronization; and
    terminate the transmission/reception synchronization.

9. A non-transitory computer-readable storage medium storing instructions that, when executed by a first user equipment (UE), cause the first UE to:
    buffer, for a delay time period, real-time conference data of a real-time conference session;
    generate a conference data bundle that comprises synchronized audio and video data from the real-time conference data; and
    transmit the conference data bundle after the delay time period.

10. The computer-readable storage medium of claim 9, wherein the instructions further cause the first UE to:
    determine an audio energy level of an audio portion of the real-time conference data; and
    extend the delay time period if the audio energy level is below a threshold.

11. The computer-readable storage medium of claim 9, wherein the instructions further cause the first UE to:
    determine an amount of motion in video frames of the real-time conference data; and
    extend the delay time period if the amount of motion is below a threshold.

12. The computer-readable storage medium of claim 9, wherein the instructions further cause the first UE to:
    buffer the conference data bundle until second conference data is received from a remote device of the real-time conference session; and
    when the second conference data is received, perform the transmitting operation.

13. The computer-readable storage medium of claim 9, wherein the instructions further cause the first UE to:
    set the delay time period based on an inactive time for a remote device of the real-time conference session.

14. The computer-readable storage medium of claim 9, wherein the real-time-conference data is generated by a real-time video conference application.

15. An apparatus, comprising:
one or more processors; and
wireless communication circuitry;
wherein the one or more processors are configured to cause the apparatus to:
  buffer, for a delay time period, real-time conference data of a real-time conference session; and
  generate a conference data bundle that comprises synchronized audio and video data from the real-time conference data; and
  transmit, via the wireless communication circuitry, the conference data bundle after the delay time period.

16. The apparatus of claim 15, wherein the one or more processors are further configured to cause the apparatus to:
  determine an audio energy level of an audio portion of the real-time conference data; and
  extend the delay time period if the audio energy level is below a threshold.

17. The apparatus of claim 15, wherein the one or more processors are further configured to cause the apparatus to:
  determine an amount of motion in video frames of the real-time conference data; and
  extend the delay time period if the amount of motion is below a threshold.

18. The apparatus of claim 15, wherein the one or more processors are further configured to cause the apparatus to:
  buffer the conference data bundle until second conference data is received from a remote device of the real-time conference session; and
  perform the transmit operation when the second conference data is received.

19. The apparatus of claim 15, wherein the one or more processors are further configured to cause the apparatus to:
  set the delay time period based on an inactive time for a remote device of the real-time conference session.

20. The apparatus of claim 15, wherein the real-time-conference data is generated by a real-time video conference application executed on the apparatus.

* * * * *